(12) United States Patent
Uenosono et al.

(10) Patent No.: US 9,960,515 B2
(45) Date of Patent: May 1, 2018

(54) CONNECTOR

(71) Applicant: Yazaki Corporation, Minato-ku, Tokyo (JP)

(72) Inventors: Daisuke Uenosono, Kakegawa (JP); Takashi Tsukamoto, Kakegawa (JP); Masaya Okamoto, Fujieda (JP); Naoto Sugie, Kakegawa (JP); Koutatsu Shibayama, Kakegawa (JP)

(73) Assignee: YAZAKI CORPORATION, Tokyo (JP)

(*) Notice: Subject to any disclaimer, the term of this patent is extended or adjusted under 35 U.S.C. 154(b) by 0 days. days.

(21) Appl. No.: 15/647,531

(22) Filed: Jul. 12, 2017

(65) Prior Publication Data

US 2018/0019532 A1  Jan. 18, 2018

(30) Foreign Application Priority Data

Jul. 13, 2016 (JP) ................................. 2016-138795

(51) Int. Cl.
| | |
|---|---|
| H01R 13/40 | (2006.01) |
| H01R 13/11 | (2006.01) |
| H01R 24/20 | (2011.01) |
| H01R 13/422 | (2006.01) |
| B60L 11/18 | (2006.01) |
| H01R 107/00 | (2006.01) |

(52) U.S. Cl.
CPC .......... *H01R 13/11* (2013.01); *B60L 11/1818* (2013.01); *H01R 13/4223* (2013.01); *H01R 24/20* (2013.01); *H01R 2107/00* (2013.01); *H01R 2201/26* (2013.01)

(58) Field of Classification Search
CPC .............. H01R 13/424; H01R 2201/26; H01R 2107/00; H01R 24/20; H01R 13/4223; H01R 13/11; B60L 11/1818
USPC .................................. 439/752, 595, 871, 744
See application file for complete search history.

(56) References Cited

U.S. PATENT DOCUMENTS

| | | | | |
|---|---|---|---|---|
| 5,145,419 A | * | 9/1992 | Yamanashi | H01R 13/4368 439/595 |
| 5,346,414 A | * | 9/1994 | Sakai | H01R 13/4367 439/595 |
| 5,397,249 A | * | 3/1995 | Endo | H01R 13/4368 439/595 |
| 5,571,032 A | * | 11/1996 | Sano | H01R 13/5208 439/589 |
| 5,713,761 A | * | 2/1998 | Okayasu | H01R 13/4364 439/271 |

(Continued)

FOREIGN PATENT DOCUMENTS

JP            2015-11797 A       1/2015

*Primary Examiner* — Abdullah Riyami
*Assistant Examiner* — Nelson R Burgos-Guntin
(74) *Attorney, Agent, or Firm* — Sughrue Mion, PLLC

(57) ABSTRACT

A connector includes a housing that has a plurality of terminal receiving chambers into which a terminal is inserted, each terminal receiving chamber being provided with a housing flexible piece for retaining and locking the terminal, and a rear holder that is mounted at the housing, abuts on the housing flexible piece and restrains locking release of the housing flexible piece. In the connector, the rear holder has a holder locking protrusion for retaining and locking the terminal in each terminal receiving chamber.

5 Claims, 7 Drawing Sheets

(56) References Cited

U.S. PATENT DOCUMENTS

| | | | | |
|---|---|---|---|---|
| 5,716,234 A * | 2/1998 | Phillips | H01R 13/4365 | 439/595 |
| 5,746,624 A * | 5/1998 | Ohsumi | H01R 13/6315 | 439/595 |
| 6,551,145 B2 * | 4/2003 | Kurimoto | H01R 13/4362 | 439/595 |
| 6,595,807 B2 * | 7/2003 | Kashiyama | H01R 13/4362 | 439/752 |
| 6,716,052 B2 * | 4/2004 | Kane | H01R 13/641 | 439/352 |
| 6,814,632 B1 * | 11/2004 | Peterson | H01R 13/5205 | 439/589 |
| 6,817,900 B2 * | 11/2004 | Yamawaki | H01R 13/4364 | 439/595 |
| 8,231,409 B2 * | 7/2012 | Lebrun | H01R 13/4365 | 439/595 |
| 8,282,427 B2 * | 10/2012 | Yamazaki | H01R 13/4368 | 439/595 |
| 9,444,172 B2 * | 9/2016 | Kawakami | H01R 13/114 | |
| 2001/0006861 A1 * | 7/2001 | Ohsumi | H01R 13/4223 | 439/752 |
| 2003/0157835 A1 * | 8/2003 | Ishikawa | H01R 13/4223 | 439/595 |
| 2004/0067686 A1 * | 4/2004 | Nimura | H01R 13/4365 | 439/595 |
| 2004/0203287 A1 * | 10/2004 | Itou | H01R 13/4223 | 439/595 |
| 2005/0085126 A1 * | 4/2005 | Sagawa | H01R 13/4365 | 439/595 |
| 2011/0263148 A1 * | 10/2011 | Obata | H01R 13/4223 | 439/271 |
| 2015/0349448 A1 * | 12/2015 | Kawakami | H01R 13/114 | 439/744 |
| 2016/0111831 A1 | 4/2016 | Kawai et al. | | |
| 2018/0019532 A1 * | 1/2018 | Uenosono | H01R 13/11 | |

* cited by examiner

CONNECTOR

CROSS REFERENCE TO RELATED APPLICATION

This application is based on Japanese Patent Application No. 2016-138795 filed on Jul. 13, 2016, the contents of which are incorporated herein by reference.

BACKGROUND OF THE INVENTION

1. Technical Field

The present invention relates to a connector.

2. Background Art

For charging a vehicle installed with a battery, such as an electric car and a plug-in hybrid car, a power feeding connector is used. The power feeding connector includes a power feeding-side connector connected to a power feeding device and a power receiving-side connector, to which the power feeding-side connector is fitted and connected, and which is mounted in the vehicle. These connectors (also called a charge connector) are provided in a connector housing thereof with a plurality of terminal receiving chambers in which terminals are mounted. When a terminal is inserted into the terminal receiving chamber from the rear side of the housing, the terminal is prevented from being moved in a terminal drawing-out direction by a lance (a housing flexible piece) provided to the terminal receiving chamber, thereby being held in the housing (for example, see JP-A-2015-011797).

As illustrated in FIG. 7, in order to improve holding reliability of a terminal 501, a connector 500 is provided with a rear holder 505 that restrains locking release of a housing flexible piece 503. In this case, the terminal 501 is retained (primarily locked) from a housing 509 by the housing flexible piece 503 formed in a terminal receiving chamber 507. In addition, the housing flexible piece 503 is prevented from being deformed (secondarily locked) in a locking release direction by a rear holder retainer 511 of the rear holder 505. As a consequence, the terminal 501 is doubly locked, so that reliability of terminal holding is improved.

The locking directions in these cases are all locking directions of a direction crossing (substantially orthogonal to) a terminal insertion direction (a direction an indicated by an arrow in the drawing).

However, in all the aforementioned charge connector disclosed in JP-A-2015-11797 and the connector 500 provided with the rear holder 505, the terminal 501 is held only by one housing flexible piece 503. Therefore, the related charge connector and connector 500 have a limitation in improving holding reliability. On the other hand, in a restricted transverse section of the housing 509 in which a plurality of terminal receiving chambers 507 are provided in parallel, it is difficult to form a plurality of housing flexible pieces 503 in terms of space.

The present invention has been made to solve the above-described matter, and an object of the present invention is to provide a connector capable of improving terminal holding power.

SUMMARY OF INVENTION

The aforementioned object of the present invention is achieved by the following configurations.

(1) According to an aspect of the invention, a connector includes a housing that has a plurality of terminal receiving chambers into which a terminal is inserted, each terminal receiving chamber being provided with a housing flexible piece for retaining and locking the terminal, and a rear holder that is mounted at the housing, abuts on the housing flexible piece and restrains locking release of the housing flexible piece. In the connector, the rear holder has a holder locking protrusion for retaining and locking the terminal in each terminal receiving chamber.

According to the connector of the aforementioned configuration (1), when the connector is connector-fitted to a counterpart connector, retaining and locking of the terminal for the connector fitting direction are performed at two places of the housing flexible piece and the holder locking protrusion, so that terminal holding power is improved. The holder locking protrusion abuts on the terminal from the insertion direction of the terminal and prevents the terminal from coming out backward in a direction opposite to the insertion direction of the terminal. The holder locking protrusion formed in the rear holder easily forms a large abutting area when retaining and locking the terminal as compared with the housing flexible piece formed in the terminal receiving chamber, so that it is possible to obtain high resistance to coming-out backward.

(2) In the connector (1), the holder locking protrusion abuts on the terminal earlier than the housing flexible piece to retain and lock the terminal in assembling According to the connector of the aforementioned configuration (2), at the time of connector-fitting and the like, the holder locking protrusion formed in the rear holder mounted at the housing has holding power higher than that of the housing flexible piece formed in the housing with respect to the connector-fitting direction, and can absorb impact when the terminal abuts thereon. Accordingly, the holder locking protrusion abuts on the terminal earlier than the housing flexible piece so as to retain and lock the terminal, thereby improving impact strength of the connector.

(3) In the connector (1) or (2), the holder locking protrusion is made of a flexible piece for retaining and locking the terminal.

According to the connector of the aforementioned configuration (3), since the holder locking protrusion is the flexible piece, when the terminal is inserted from the terminal insertion opening of the rear holder, the holder locking protrusion is withdrawn, so that the terminal insertion is not disturbed. Consequently, insertion workability of the terminal is improved.

(4) In the connector (3) a temporary locking mechanism is formed by the housing and the rear holder, in a fully locked state of the rear holder and the housing, the rear holder is in contact with the housing flexible piece, and in a temporarily locked state of the rear holder and the housing, the rear holder is not in contact with the housing flexible piece.

According to the connector of the aforementioned configuration (4), with the rear holder being mounted at the housing in the temporarily locked state, the terminal can be inserted into the terminal receiving chamber and can be retained and locked to the housing flexible piece. That is, in the temporarily locked state, the rear holder is not locked to the housing flexible piece, so that the insertion of the terminal due to bending of the housing flexible piece is possible. Accordingly, it is possible to assemble the terminal to the housing and the rear holder in the sub-assembled state, and when the rear holder is in the fully locked state, the terminal is retained and locked to the housing flexible piece and the holder locking protrusion, so that assembling workability is improved.

According to the connector of the present invention, it is possible to improve terminal holding power.

The present invention has been briefly described above. Moreover, a mode (hereinafter, referred to as an "embodiment") for carrying out the invention to be described below is read through with reference to the accompanying drawings, so that details of the present invention will be further clarified.

DETAILED DESCRIPTION OF EMBODIMENTS

Hereinafter, an embodiment according to the present invention will be described with reference to the drawings.

Figure 1:
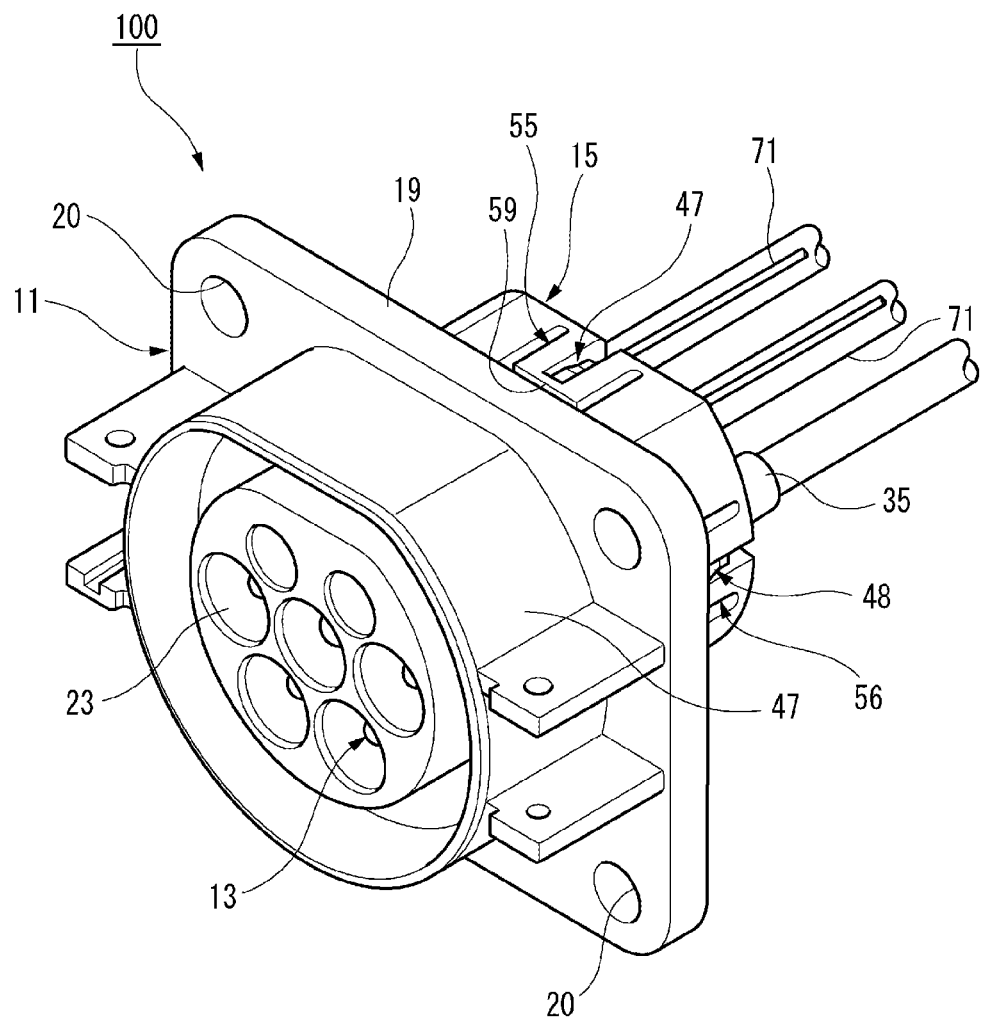
FIG. 1 is a perspective view of a connector according to one embodiment of the present invention.
Figure 1:
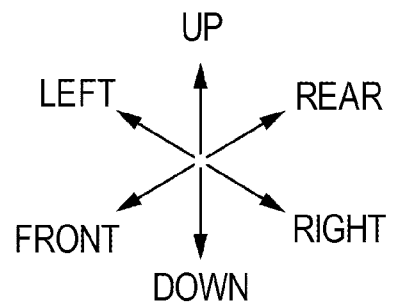
Figure 2:
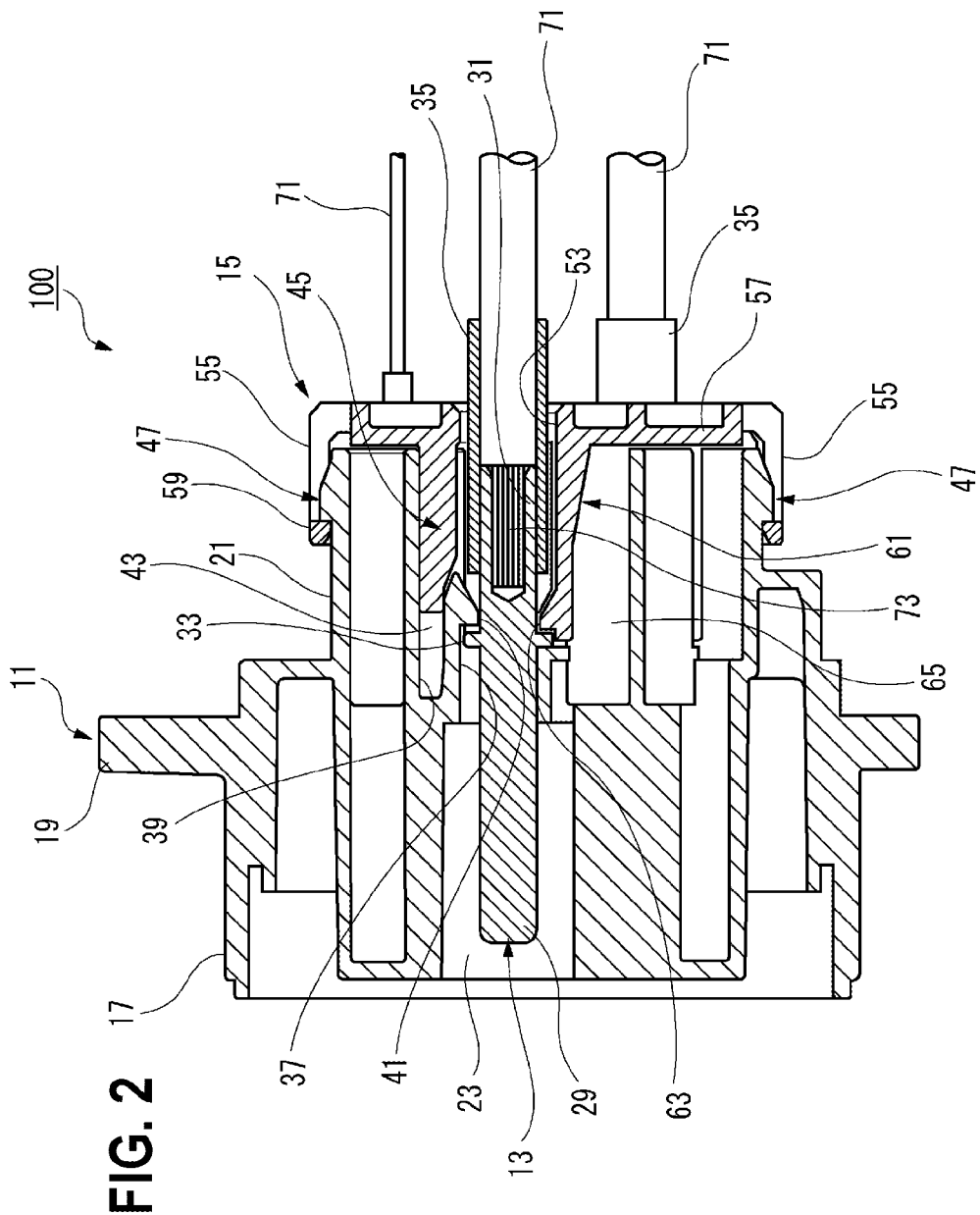
FIG. 2 is a longitudinal sectional view of the connector illustrated in FIG. 1.

FIGS. 1 and 2 are a perspective view and a longitudinal sectional view of a connector according to one embodiment of the present invention.

A charge connector 100 according to the present embodiment, for example, can be preferably used for a power receiving-side connector installed at a vehicle. Of course, the connector according to the present invention may also be used as a power feeding-side connector installed at a vehicle. Hereinafter, in the present embodiment, the charge connector 100 will be described. The charge connector 100 includes a housing 11 having a plurality of terminal receiving chambers 23, terminals 13 connected to wire ends, and a rear holder 15 as main elements.

In the present embodiment, the up, down, front, rear, right, and left directions follow the arrow directions illustrated in FIG. 1.

As illustrated in FIGS. 1 and 2, the housing 11 is an insulating resin housing having a connector fitting part 17, a mounting flange part 19 protruding sideward from the connector fitting part 17, and an inner cylindrical part 21 protruding from the mounting flange part 19 to a side opposite to the connector fitting part 17. At a front end surface of the connector fitting part 17, distal end sides of the plurality of terminal receiving chambers 23 are opened, and counterpart female terminals 27 of a counterpart connector (a power feeding-side connector) 25 (see FIG. 5) are inserted from the openings. A distal end surface of the connector fitting part 17 is opened and closed by a lid (not illustrated). The charge connector 100 is bolt-fixed to a vehicle body side by using mounting holes 20 of the mounting flange part 19. At a rear end surface of the inner cylindrical part 21, each terminal receiving chamber 23 is opened. Wires 71, such as wires for power supply, wires for grounding, and wires for signals, which are connected to the terminals 13, are drawn out into the vehicle body from these openings.

The plurality of terminals 13 are inserted into the respective terminal receiving chambers 23. The plurality of terminals 13 include, for example, power receiving terminals connected to the power supply wires, terminals for grounding connected to the wires for grounding, and the like.

The terminal 13 is formed in an approximately columnar shape by cutting a conductive metal. In addition, the terminal may also be formed by bending a conductive metal plate material having a predetermined shape by press working. The terminal 13 includes a counterpart terminal contact part 29 with which the counterpart female terminal 27 (see FIG. 5) contacts, a wire connection part 31 connected to the wire 71, and a flange part 33 provided between the counterpart terminal contact part 29 and the wire connection part 31 and protruding in a circular flanged shape.

The flange part 33 serves as a locking part at which the terminal 13 is retained from the housing 11. The counterpart terminal contact part 29 is formed in a circular rod shape. That is, the terminal 13 serves as a male terminal. The wire connection part 31 is crimped and connected to a conductor 73 of the wire 71. Moreover, waterproofing is performed between the wire connection part 31 and the wire 71 by covering an outer peripheral surface with a heat shrink tube 35.

As illustrated in FIG. 2, the terminal receiving chamber 23 is provided with a housing flexible piece 37 that retains and fixes the terminal 13. The housing flexible piece 37 has a cantilever shape in which its base is connected to a ceiling surface 39 of each terminal receiving chamber 23, and is arranged in the terminal receiving chamber 23 such that a free end opposite to the base extends to a rear side of the housing along the insertion direction of the terminal 13. The housing flexible piece 37 is provided on a lower surface of a protruding distal end thereof with a locking stepped portion 41. The locking stepped portion 41 locks the flange part 33 serving as a locking part of the terminal 13, and restrains the terminal 13 from coming out backward. When the terminal 13 is inserted, the housing flexible piece 37 is pushed up by the flange part 33 of the terminal 13 (see FIG. 4B). When the terminal 13 is inserted to a predetermined position, the locking stepped portion 41 coincides with a rear end surface of the flange part 33, returns to the original position by elastic restoring force, and locks the rear end surface of the flange part 33 (see FIG. 4C).

In the terminal receiving chamber 23, a flexible space 43 is formed between the ceiling surface 39 and the protruding distal end of the housing flexible piece 37 to enable the protruding distal end of the pushed-up housing flexible piece 37 to move. A retainer part 45 of the rear holder 15 is inserted into the flexible space 43, so that locking release of the housing flexible piece 37 with respect to the terminal 13 is restrained. In the present specification, the state, in which the locking release of the housing flexible piece 37 with respect to the terminal 13 is restrained by the retainer part 45, is called a double locked state of the terminal 13.

Figure 3A:
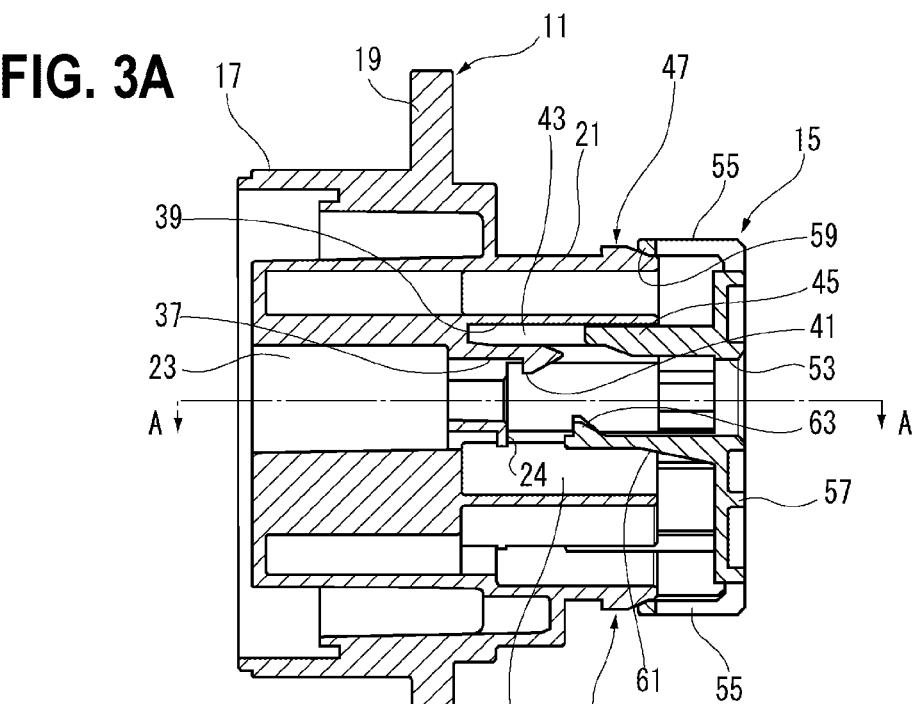
FIG. 3A is a longitudinal sectional view of the connector in which a rear holder illustrated in FIG. 2 is in a temporarily locked state with respect to a housing and FIG. 3B is a sectional view taken along an arrow A-A of FIG. 3A.
Figure 3B:
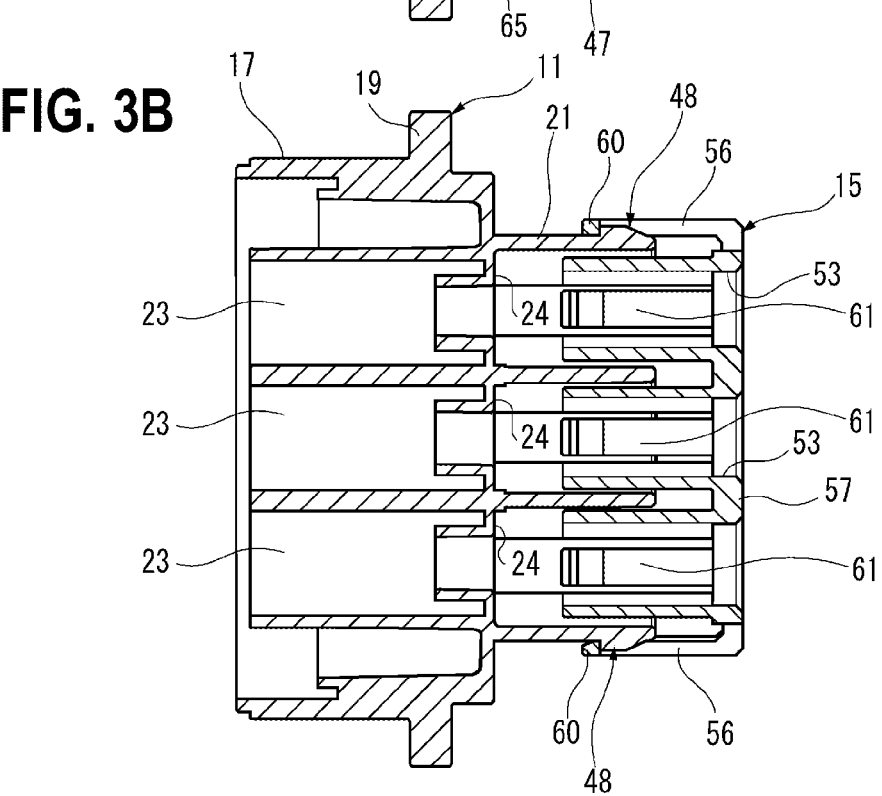

As illustrated in FIGS. 3A and 3B, from the outer periphery of the inner cylindrical part 21, a plurality of (a pair of upper and lower in the present embodiment) main locking protrusions 47 for fully locking the rear holder 15 and a plurality of (a pair of right and left in the present embodiment) temporary locking protrusions 48 for temporarily locking the rear holder 15 protrude. In the main locking protrusion 47, its front end side serves as a vertical surface orthogonal to a holder insertion direction for locking a locking part 59 of a main holder locking arm 55, and its rear end side serves as an inclination surface for engaging and guiding the locking part 59. In the temporary locking protrusion 48, its front end side serves as a vertical surface orthogonal to a holder insertion direction for locking a locking part 60 of a temporary holder locking arm 56, and its rear end side serves as an inclination surface for engaging and guiding the locking part 60. That is, these temporary holder locking arm 56 and temporary locking protrusion 48 constitute a temporary locking mechanism.

The rear holder 15 is mounted on the rear end surface of the inner cylindrical part 21 in the housing 11. The rear holder 15 is formed with a plurality of terminal insertion holder openings (terminal insertion openings) 53 enabling the insertion of the terminal 13 from the rear side.

The rear holder 15 has a plurality of (a pair of upper and lower in the present embodiment) main holder locking arms 55 which are mounted to the housing 11, and a plurality of (a pair of right and left in the present embodiment) temporary holder locking arms 56 which are temporarily locked to the housing 11.

In the temporary holder locking arm 56, its proximal end is supported to a right and left part of a rear holder body 57 and its insertion distal end serves as a free end. The temporary holder locking arm 56 is provided at the distal end thereof with a locking part 60. The locking part 60 is locked to the temporary locking protrusion 48 of the housing 11. The locking part 60 of the temporary holder locking arm 56 is locked to the temporary locking protrusion 48, so that the rear holder 15 is held in the housing 11 in a temporarily locked state. In this case, the locking part 60 of the temporary holder locking arm 56 enables further insertion of the rear holder 15 from the temporarily locked state to the fully locked state.

In the main holder locking arm 55, its proximal end is supported to an upper and a lower part of the rear holder body 57 and its insertion distal end serves as a free end. The main holder locking arm 55 is provided at the distal end thereof with a locking part 59. The locking part 59 is locked to the main locking protrusion 47 of the housing 11. The locking part 59 of the main holder locking arm 55 is locked to the main locking protrusion 47, so that the rear holder 15 is held in the housing 11 in the fully locked state.

The main holder locking arm 55 is formed to be slightly shorter than the temporary holder locking arm 56, and when the locking part 60 of the temporary holder locking arm 56 is locked to the temporary locking protrusion 48, the locking part 59 is positioned at a rear end side from the main locking protrusion 47, so that the locking part 59 is not locked.

Moreover, the rear holder 15 has the retainer part 45 and a holder locking protrusion 61. The holder locking protrusion 61 is provided at the distal end thereof with a flange abutting stepped portion 63. When the rear holder 15 is mounted at (is fully locked to) the housing 11, the retainer part 45 is in contact with the housing flexible piece 37 (enters into the flexible space 43) to restrain the locking release of the housing flexible piece 37. The flange abutting stepped portion 63 abuts on the rear end surface of the flange part 33, so that the holder locking protrusion 61 further retains and locks the terminal 13 held to the terminal receiving chamber 23 by the housing flexible piece 37.

In the present embodiment, the holder locking protrusion 61 is formed in a cantilever shape in which its proximal end is fixed to the rear holder body 57, and is a flexible piece in which its distal end serves as a free end.

Furthermore, the protruding length of the holder locking protrusion 61 is set such that the holder locking protrusion 61 abuts on the flange part 33 earlier than the housing flexible piece 37 to retain and lock the terminal 13 when the terminal 13 received in the terminal receiving chamber 23 moves rearward. That is, a gap FH between the flange part 33 and the flange abutting stepped portion 63 is set to be smaller than a gap FL between the flange part 33 and the locking stepped portion 41 (see FIG. 6).

When the rear holder 15 is mounted at the housing 11, the insertion distal end of the retainer part 45 is inserted into the flexible space 43 of the terminal receiving chamber 23. That is, the retainer part 45 restrains the housing flexible piece 37 locking the terminal 13 from moving into the flexible space 43, and performs double locking for reliably retaining and locking the terminal 13.

As described above, in the charge connector 100, the temporary locking mechanism is provided between the housing 11 and the rear holder 15. In the state in which the rear holder 15 is in the temporarily locked state with respect to the housing 11, the retainer part 45 is not in contact with the housing flexible piece 37, and in the fully locked state, the retainer part 45 is in contact with the housing flexible piece 37.

The terminal 13 is inserted into the terminal receiving chamber 23 of the housing 11 via the terminal insertion holder opening 53 of the rear holder 15, which is temporarily locked to the inner cylindrical part 21, from each opening opened to the rear end surface of the inner cylindrical part 21, and is fixed to a predetermined insertion position.

Preferably, the rear holder 15, for example, is integrally formed with a resin material such as POM (polyoxymethylene) having a superior mechanical strength. By so doing, the rear holder 15 can enhance impact strength of the holder locking protrusion 61.

Next, an assembling procedure of the charge connector 100 having the aforementioned configuration will be described.

In order to assemble the charge connector 100, the rear holder 15 is first mounted at the inner cylindrical part 21 of the housing 11 in the temporarily locked state. As illustrated in FIG. 3B, the rear holder 15 is held to the housing 11 at a temporary locking position by allowing the locking part 60 of the temporary holder locking arm 56 to be locked to the temporary locking protrusion 48 of the housing 11.

In the temporarily locked state of the rear holder 15, the retainer part 45 is arranged at a position just before the flexible space 43. That is, the retainer part 45 does not enter into the flexible space 43, thereby enabling bending of the housing flexible piece 37. Furthermore, in the rear holder 15, the holder locking protrusion 61 is arranged in contact with a holder locking protrusion flexible space 65 of the housing 11. That is, bending of the holder locking protrusion flexible space 65 becomes possible, so that the holder locking protrusion 61 enables insertion of the terminal 13 from a rear side.

Figure 4A:
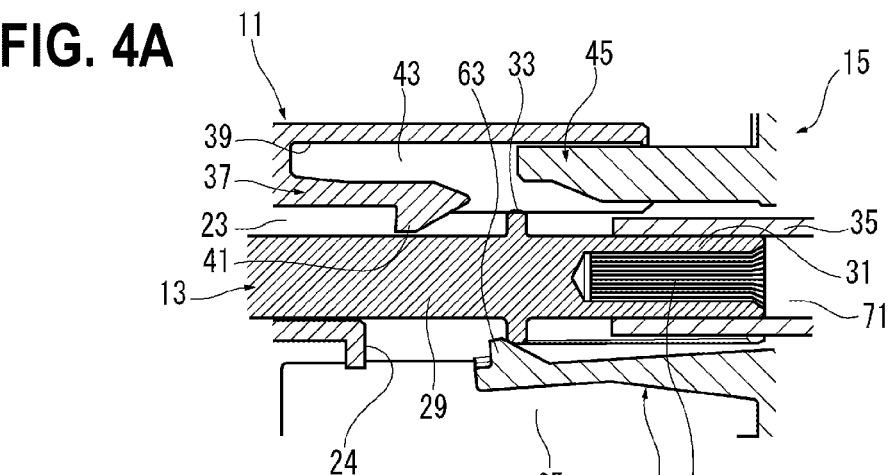
FIGS. 4A to 4C are explanation views for explaining operations of the connector into which a terminal is inserted.

Then, the terminal 13 connected to an end portion of the wire 71 is inserted into the terminal receiving chamber 23 by inserting through the terminal insertion holder opening 53 of the rear holder 15. In this case, when the flange part 33 of the terminal 13 abuts on the flange abutting stepped portion 63 of the holder locking protrusion 61, since the holder locking protrusion 61 is bent and deformed so as to be pushed down as illustrated in FIG. 4A, the insertion of the terminal 13 is permitted.

Figure 4B:
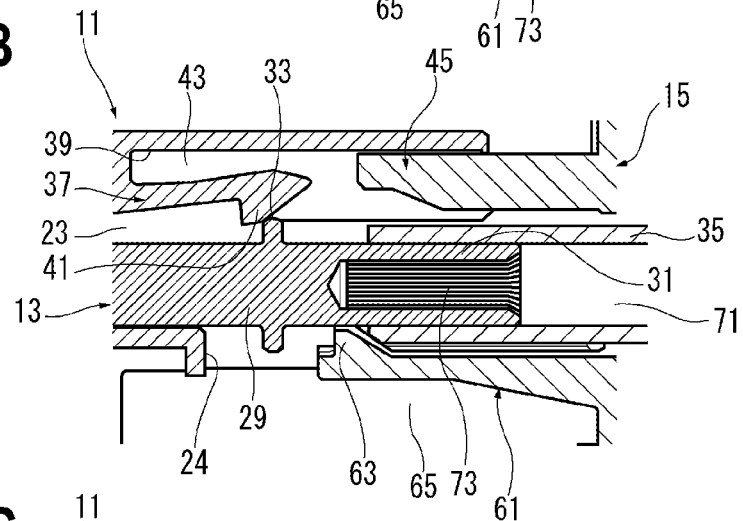

When the terminal 13 is more deeply inserted, the flange part 33 of the terminal 13 abuts the locking stepped portion 41 of the housing flexible piece 37, so that the housing flexible piece 37 is bent and deformed so as to be pushed up as illustrated in FIG. 4B.

Figure 4C:
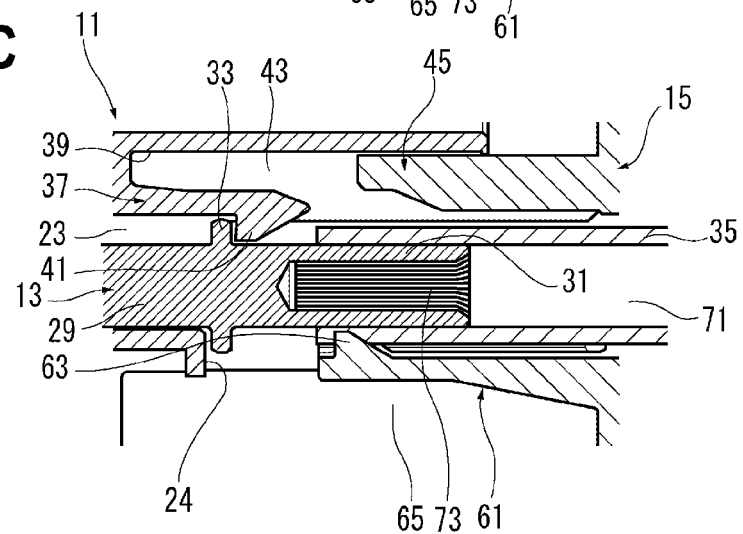

When the terminal 13 is inserted to a predetermined position at which the flange part 33 abuts on a terminal positioning part 24, the locking stepped portion 41 coincides with the rear end surface of the flange part 33, returns to the original position by elastic restoring force, and locks the rear end surface of the flange part 33 as illustrated in FIG. 4C.

By so doing, after all the terminals 13 are completely inserted, the rear holder 15 is pushed into the main locking position of the housing 11. The locking part 59 of the main holder locking arm 55 is locked to the main locking protrusion 47 of the housing 11, the rear holder 15 is held to the housing 11 at the main locking position (see FIG. 2).

When the rear holder 15 is in the fully locked state, the distal end of the holder locking protrusion 61 is arranged at the rear side of the flange part 33 of the terminal 13 and the retainer part 45 enters into the flexible space 43 as illustrated in FIG. 2. The flange part 33 is locked to the locking stepped portion 41 of the housing flexible piece 37 and abuts on the distal end of the holder locking protrusion 61, so that the terminal 13 is restrained from moving rearward. Furthermore, bending of the housing flexible piece 37 in the locking release direction with respect to the flange part 33 is prevented by the retainer part 45 entered into the flexible space 43, so that the housing flexible piece 37 locks the terminal 13 in a double locked state. By so doing, the assembling of the charge connector 100 is completed.

Next, operations of the configuration in the aforementioned charge connector 100 will be described.

Figure 5:
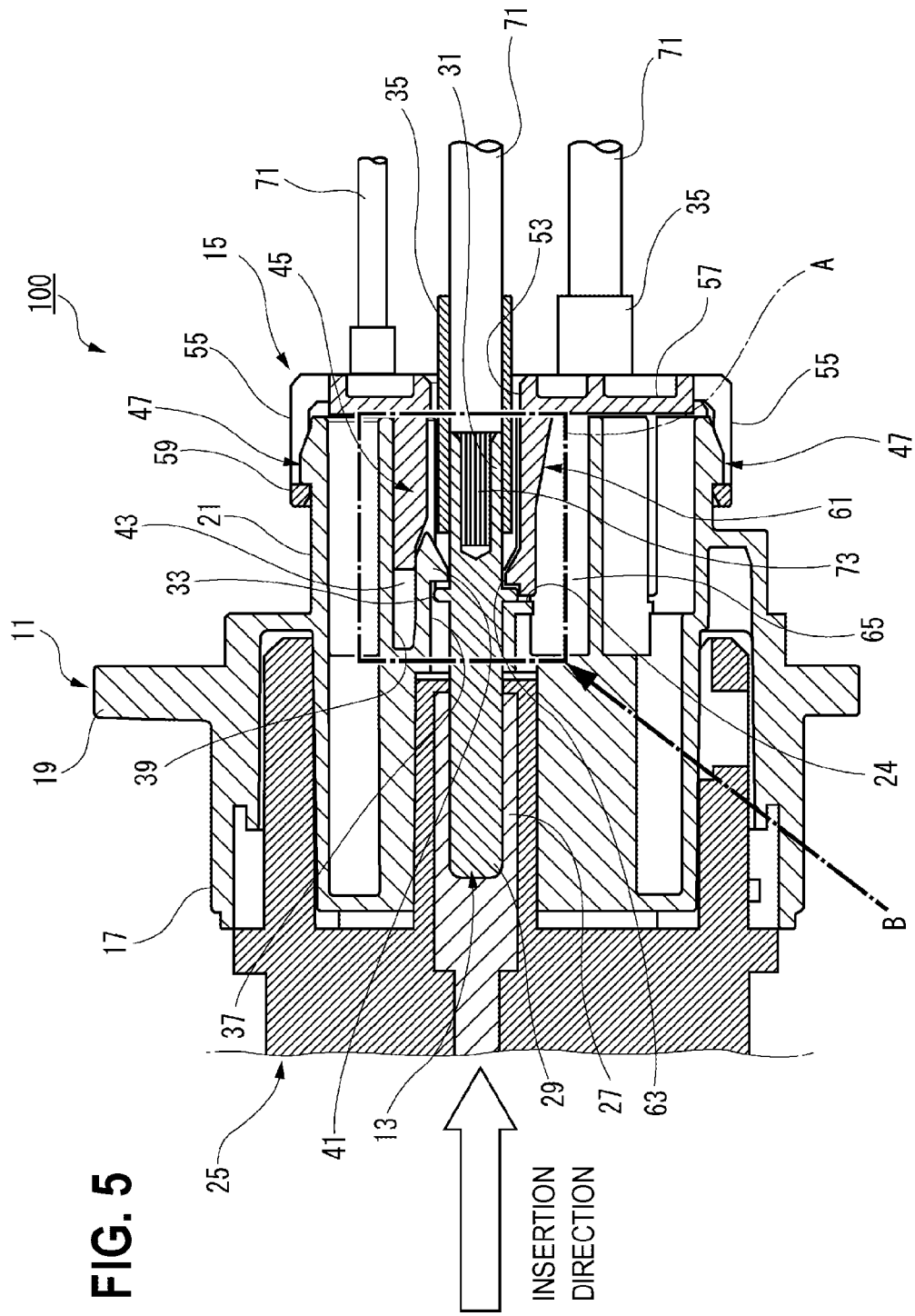
FIG. 5 is a longitudinal sectional view of the connector in which a counterpart connector is fitted.

As illustrated in FIG. 5, when the charge connector 100 according to the present embodiment is connector-fitted to the counterpart connector 25, retaining and locking of the terminal 13 for the connector fitting direction are performed at two places of the housing flexible piece 37 and the holder locking protrusion 61, so that terminal holding power is improved. The holder locking protrusion 61 abuts on the terminal 13 from the insertion direction of the terminal 13 and prevents the terminal 13 from coming out backward in a direction opposite to the insertion direction of the terminal 13. The holder locking protrusion 61 formed in the rear holder 15 easily forms a large abutting area when retaining and locking the terminal 13 as compared with the housing flexible piece 37 formed in the terminal receiving chamber 23, so that it is possible to obtain high resistance to coming-out backward.

That is, in the fully locked state of the rear holder 15, the charge connector 100 holds that the retainer part 45 presses down the housing flexible piece 37 in a direction (an approximately orthogonal direction) crossing the insertion direction of the terminal 13. By so doing, the flange part 33 is reliably locked by the locking stepped portion 41 of the housing flexible piece 37, so that the terminal 13 is held with high strength.

Moreover, in the fully locked state of the rear holder 15, the flange abutting stepped portion 63 of the holder locking protrusion 61 is arranged in proximity to the rear end surface of the flange part 33 so as to be abuttable. When the terminal 13 is withdrawn by frictional force with the counterpart female terminal 27 at the time of fitting with the counterpart female terminal 27, the flange part 33 abuts on the flange abutting stepped portion 63 of the holder locking protrusion 61. By so doing, the terminal 13 is reliably restrained from being coming out backward by the holder locking protrusion 61 that supports force from the counterpart female terminal 27 and thus is held with high strength.

Figure 6:
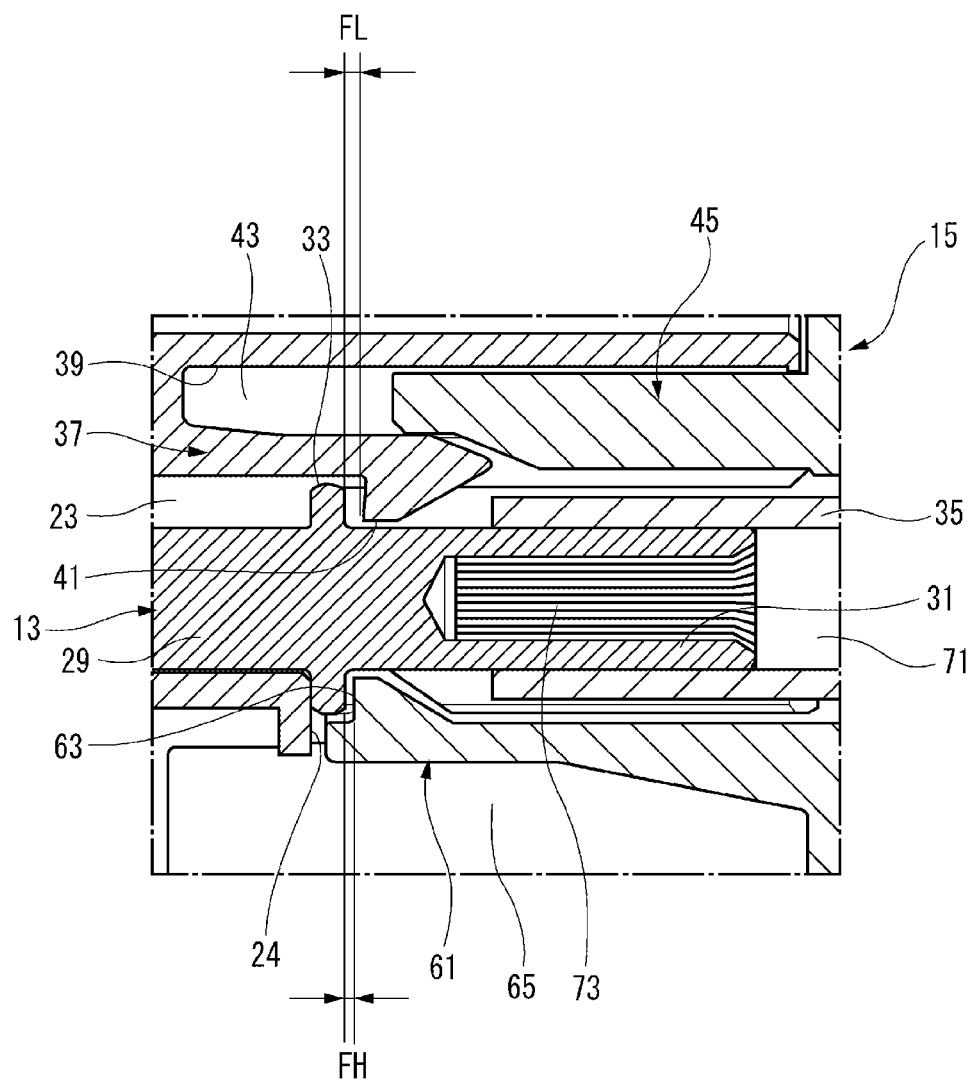
FIG. 6 is an enlarged view of a part B of FIG. 5.
Figure 7:
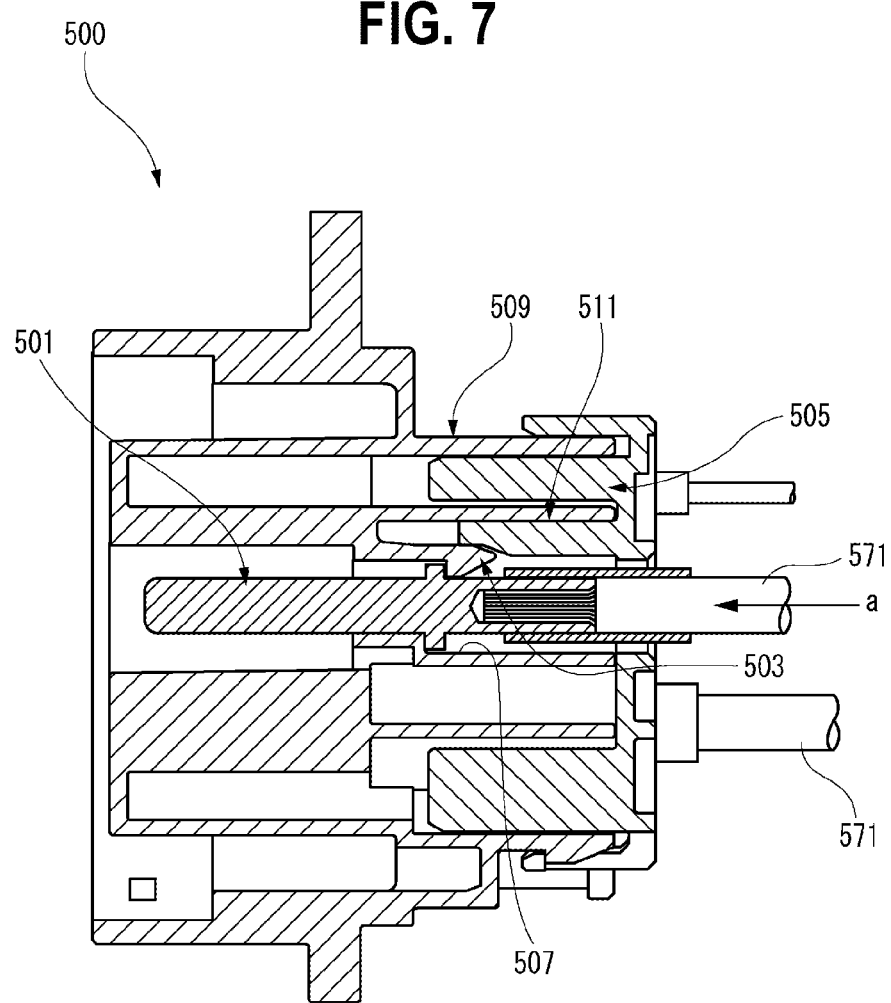
FIG. 7 is a longitudinal sectional view of a connector of the related art.

Furthermore, in the charge connector 100 of the present embodiment, when the rear holder 15 is in the fully locked state, as illustrated in FIG. 6, the gap FH between the flange part 33 and the flange abutting stepped portion 63 of the holder locking protrusion 61 is set to be smaller than the gap FL between the flange part 33 of the terminal 13 and the locking stepped portion 41 of the housing flexible piece 37. Accordingly, at the time of connector-fitting, the holder locking protrusion 61 abuts on the terminal 13 earlier than the housing flexible piece 37, thereby retaining and locking the terminal 13. The holder locking protrusion 61 formed in the rear holder 15 mounted at the housing 11 has holding power higher than that of the housing flexible piece 37 formed in the housing 11 as described above with respect to the connector-fitting direction, and can absorb impact when the terminal 13 abuts thereon. Accordingly, the holder locking protrusion 61 with a large withstanding load abuts on the terminal 13 earlier than the housing flexible piece 37 so as to retain and lock the terminal 13, thereby improving impact strength of the charge connector 100. That is, at the time of fitting with the counterpart female terminal 27, the terminal 13 is first supported by the holder locking protrusion 61 with a large withstanding load.

Furthermore, in the charge connector 100 of the present embodiment, the holder locking protrusion 61 of the rear holder 15 is made up of a flexible piece. Since the holder locking protrusion 61 is the flexible piece, when the terminal 13 is inserted from the terminal insertion holder opening 53 of the rear holder 15, the holder locking protrusion 61 is withdrawn, so that the terminal insertion is not disturbed. Consequently, it is possible to use the terminal 13 including the flange part 33 having an annular shape and to perform terminal insertion work regardless of the insertion direction (the circumferential direction) of the terminal 13, so that insertion workability of the terminal 13 is improved.

Moreover, in the charge connector 100 of the present embodiment, with the rear holder 15 being mounted at the housing 11 in the temporarily locked state, the terminal 13 can be inserted into the terminal receiving chamber 23 and can be retained and locked to the housing flexible piece 37. That is, in the temporarily locked state, the rear holder 15 is not locked to the housing flexible piece 37, so that the insertion of the terminal 13 due to bending of the housing flexible piece 37 is possible. Accordingly, it is possible to assemble the terminal 13 in the sub-assembled state of the housing 11 and the rear holder 15, and when the rear holder 15 is in the fully locked state, the terminal 13 is retained and locked to the housing flexible piece 37 and the holder locking protrusion 61, so that assembling workability is improved.

Consequently, according to the charge connector 100 of the present embodiment, it is possible to improve terminal holding power.

It is noted that the present invention is not limited to the aforementioned embodiment, modifications and applications by a person skilled in the art are predicted in the present invention on the basis of combinations of the elements of the embodiment, description of the specification, and the well-known technology, and are included in the protection range thereof.

For example, in the aforementioned embodiment, the case in which the holder locking protrusion 61 is a flexible piece has been described as an example; however, the holder locking protrusion may have rigidity and retain a terminal without being bent. In this case, the terminal is not a cut part having the flange part 33 as the terminal 13, and for example, a locking part, which is bent by press working, is cut and raised, and has flexibility, is locked to the holder locking protrusion having rigidity. In this example, when the terminal is inserted, the locking part of the terminal is deformed to climb over the holder locking protrusion differently from the aforementioned embodiment. According to this example, the rigidity of the holder locking protrusion for restraining the terminal from coming out backward is enhanced, so that it is possible to enhance buckling strength of the holder locking protrusion. Furthermore, high resistance to coming-out backward is achieved, so that it is possible to hold the terminal with high reliability.

Hereinafter, the characteristics of the embodiment of the connector according to the aforementioned present invention will be briefly summarized in [1] to [4].

[1] A connector (100) including a housing (11) having a plurality of terminal receiving chambers (23) into which a terminal (13) is inserted, the aforementioned each terminal receiving chamber being provided with a housing flexible piece (37) for retaining and locking the aforementioned terminal, and a rear holder (15) mounted at the aforementioned housing and restraining locking release of the aforementioned housing flexible piece in engagement with the aforementioned housing flexible piece, wherein the aforementioned rear holder has a holder locking protrusion (61) for retaining and locking the aforementioned terminal in the aforementioned each terminal receiving chamber.

[2] The connector of the aforementioned [1], wherein the aforementioned holder locking protrusion abuts on the aforementioned terminal earlier than the aforementioned housing flexible piece to retain and lock the terminal.

[3] The connector of the aforementioned [1] or [2], wherein the aforementioned holder locking protrusion is made up of a flexible piece for retaining and locking the aforementioned terminal.

[4] The connector of the aforementioned [3], wherein a temporary locking mechanism (the temporary locking protrusions 48 and the temporary holder locking arm 56) is provided between the aforementioned housing and the aforementioned rear holder, and the aforementioned rear holder is in contact with the aforementioned housing flexible piece in the fully locked state for the aforementioned housing, and is not in contact with the aforementioned housing flexible piece in the temporarily locked state.

What is claimed is:

1. A connector comprising:
a housing that has a plurality of terminal receiving chambers into which a terminal is inserted, each terminal receiving chamber being provided with a housing flexible piece for retaining and locking the terminal, and
a rear holder that is mounted at the housing, abuts on the housing flexible piece and restrains locking release of the housing flexible piece,
wherein the rear holder has a holder locking protrusion for retaining and locking the terminal in each terminal receiving chamber.

2. The connector according to claim 1, wherein
the holder locking protrusion abuts on the terminal earlier than the housing flexible piece to retain and lock the terminal in assembling.

3. The connector according to claim 1, wherein
the holder locking protrusion is made of a flexible piece for retaining and locking the terminal.

4. The connector according to claim 2, wherein
the holder locking protrusion is made of a flexible piece for retaining and locking the terminal.

5. The connector according to claim 3, wherein
a temporary locking mechanism is formed by the housing and the rear holder,
in a fully locked state of the rear holder and the housing, the rear holder is in contact with the housing flexible piece, and
in a temporarily locked state of the rear holder and the housing, the rear holder is not in contact with the housing flexible piece.

* * * * *